United States Patent
Picot et al.

(10) Patent No.: US 10,981,545 B2
(45) Date of Patent: Apr. 20, 2021

(54) TELESCOPIC CLEANING DEVICE

(71) Applicant: Valeo Systèmes d'Essuyage, Le Mesnil Saint Denis (FR)

(72) Inventors: Philippe Picot, Issoire (FR); Jordan Vieille, Issoire (FR); Sébastien Rollet, Issoire (FR); Grégory Kolanowski, Issoire (FR); Giuseppe Grasso, Issoire (FR); Xavier Bousset, Issoire (FR); Maxime Baudouin, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 270 days.

(21) Appl. No.: 15/961,038

(22) Filed: Apr. 24, 2018

(65) Prior Publication Data

US 2018/0304863 A1    Oct. 25, 2018

(30) Foreign Application Priority Data

Apr. 25, 2017  (FR) ...................................... 1753573

(51) Int. Cl.
  *B60S 1/56*   (2006.01)
  *B60S 1/48*   (2006.01)
  (Continued)

(52) U.S. Cl.
  CPC  *B60S 1/56* (2013.01); *B08B 3/02* (2013.01); *B08B 3/10* (2013.01); *B60S 1/488* (2013.01);
  (Continued)

(58) Field of Classification Search
  CPC .... B60S 1/56; B60S 1/48; B60S 1/528; B60S 1/488; B60R 11/04; B08B 3/02;
  (Continued)

(56) References Cited

U.S. PATENT DOCUMENTS

2015/0138357 A1* 5/2015 Romack ................... B60S 1/522
                                                    348/148
2016/0101735 A1* 4/2016 Trebouet .................. B60S 1/56
                                                    348/148
(Continued)

FOREIGN PATENT DOCUMENTS

DE        4237856 C1   10/1993
DE       10048014 A1    4/2002
(Continued)

OTHER PUBLICATIONS

Machine Translation of DE 4237856 to Wolfram, et al., Oct. 1993. (Year: 1993).*
(Continued)

*Primary Examiner* — Benjamin L Osterhout
(74) *Attorney, Agent, or Firm* — Osha Bergman Watanabe & Burton LLP (57) ABSTRACT

A telescopic cleaning device is intended for projecting at least one cleaning and/or drying fluid onto a glass surface to be cleaned of a motor vehicle, such as an optical surface of an optical sensor of an optical detection system.
The cleaning device includes at least one fluid distribution element, rendered movable, along an axis of elongation (X) and at the end of a movable piston between a retracted first position and an extended second position for cleaning and/or drying.
The fluid distribution element comprises a distribution bar (4) inside which a fluid distribution channel (56) extends and the distribution bar is equipped with a heating device (60) integrated at least in part into the distribution bar in order to heat the fluid passing through said distribution channel.

15 Claims, 2 Drawing Sheets

(51) Int. Cl.
  *G02B 27/00* (2006.01)
  *B08B 3/02* (2006.01)
  *B08B 3/10* (2006.01)
  *B60S 1/52* (2006.01)
(52) U.S. Cl.
  CPC .......... *B60S 1/528* (2013.01); *G02B 27/0006* (2013.01); *B08B 2203/007* (2013.01)
(58) Field of Classification Search
  CPC .. B08B 3/10; B08B 2203/007; H04N 5/2252; G01S 17/931; G01S 2007/4977; G02B 27/0006
  See application file for complete search history.

(56) References Cited

U.S. PATENT DOCUMENTS

2017/0015256 A1* 1/2017 Henion ................... B60R 1/003
2017/0080863 A1* 3/2017 Henion ..................... B60R 1/12

FOREIGN PATENT DOCUMENTS

| | | |
|---|---|---|
| EP | 3006278 A1 | 4/2016 |
| FR | 2783225 A1 | 3/2000 |

OTHER PUBLICATIONS

Machine Translation of FR 2783225 to Journee et al., Mar. 2000. (Year: 2000).*
Preliminary Report and Opinion Issued in Corresponding French Application No. 1753573, dated Dec. 18, 2017 (8 Pages).

* cited by examiner

TELESCOPIC CLEANING DEVICE

The present invention relates to the area of optical detection systems which are intended to be fitted in a motor vehicle. It concerns more specifically the cleaning devices which are intended for projecting at least one cleaning or drying fluid onto an optical surface to be cleaned of an optical sensor of such an optical detection system.

Any system comprising optical sensors such as cameras, laser sensors or other sensors based on the emission and/or detection of light in the spectrum visible or invisible to humans, in particular infrared, is called an optical detection system.

The function of such detection systems is to collect data on the environment of the motor vehicle so as to supply the driver with assistance for driving and/or manoeuvring said vehicle. So that said assistance is efficient, the data supplied by the optical detection system must be of the best possible quality, and it is therefore essential to arrange specific sensors to realize said data acquisitions. To do this, a cleaning device can be controlled in order to project, onto an optical surface of a sensor of the optical detection system (for example the lens of a camera), one or several cleaning and/or drying fluids before the detection is carried out (for example the camera shot). Such cleaning devices can comprise at least one fluid conveying body formed by a movable part, constituted by a piston accommodated in an actuator cylinder, and capable of moving from a retracted position of rest to an extended cleaning position. In such an embodiment, the conveying body is usually connected, at its upstream end, and by means of a flexible supply conduit, to a tank for storing cleaning and/or drying fluid or fluids, and is connected at its downstream end, opposite to its upstream end, to a device for distributing and projecting cleaning and/or drying fluid or fluids.

It has been noted that it could be desirable to heat the cleaning fluid before it is projected onto the optical surface to be cleaned.

The invention falls within this context and aims to propose an improvement to existing solutions relative to the devices for cleaning by projection of a heated cleaning fluid onto an optical surface to be cleaned. The aim of the invention is thus to propose a cleaning device which is intended for projecting at least one fluid onto a surface to be cleaned of a motor vehicle, such as an optical surface of an optical sensor of an optical detection system, which, by means of a compact telescopic arrangement, allows the operation of the optical sensor not to be impeded and which, by means of the arrangement of a heating device, allows the cleaning power of the projected fluid to be increased such that the effectiveness of the cleaning and of the defrosting of the optical surface to be cleaned are improved.

The first object of the invention is a telescopic cleaning device which is intended for projecting at least one cleaning and/or drying fluid onto a glass surface to be cleaned of a motor vehicle, such as an optical surface of an optical sensor of an optical detection system for vehicles, the cleaning device including at least one fluid distribution element, rendered movable, along an axis of elongation and at the end of a movable piston between a retracted first position and an extended second position for cleaning and/or drying.

According to the invention, the fluid distribution element comprises a distribution bar inside which a fluid distribution channel extends and the distribution bar is equipped with a heating device integrated at least in part into the distribution bar in order to heat the fluid passing through said distribution channel.

A glass surface, or an optical surface, is to be understood as a surface that is transparent to electromagnetic rays emitted by an optical sensor, notably within the framework of detecting the distance of a vehicle or of an object in the proximity of the vehicle fitted with the cleaning device according to the invention.

According to different characteristics of the invention, taken on their own or in combination, it can be provided that:
- the heating device comprises a resistive wire;
- the heating device is arranged so as to extend at least in part in the distribution channel;
- the heating device has an inside part accommodated in the hollow body defined by the distribution bar and an outside part which extends outside the distribution bar, the heating device being configured to traverse a passage opening arranged in a of the distribution bar; the heating device has, in its inside part, the shape of a loop arranged in the distribution channel such that the outside part is formed by two joined ends of the heating device;
- the heating device can notably have an inside part in the form of a loop arranged in the distribution channel, the outside part then being formed by two joined ends;
- the passage opening is filled with a filling material, notably of resin or gel type, in order to ensure the seal between the distribution bar and the heating device;
- the length of the part inside the heating device depends on the length of the fluid distribution channel and the length of the part outside the heating device depends on the path of movement of the distribution bar between the fully retracted position and the fully extended position; in other words, the part inside the heating device has a length corresponding essentially to the length of the distribution channel, the inside part being tensioned in the interior of the distribution bar, and the part outside the heating device has a sufficient length so as not to block the movement of the distribution bar when same passes into the fully extended position, the part outside the heating device being relaxed when the distribution bar is in the fully retracted position;
- the part outside the heating device extends at a distance from the movable piston;
- the part outside the heating device is arranged in a sheath;
- the heating device extends along the fluid distribution channel, being held by means of a plurality of holding points;
- the distribution bar extends transversely on both sides of the axis of elongation along which the movable piston slides;
- the distribution bar extends essentially symmetrically on both sides of the axis of elongation along which the movable piston slides;
- the distribution channel communicates with cleaning/drying fluid supply means and comprises a plurality of distribution openings for this fluid for the ejection of same onto the optical surface to be cleaned;
- the fluid distribution channel forms a closed circuit with two main parts connected together at their ends, one of which communicates with the cleaning/drying fluid supply and the other comprises the distribution openings; and the part inside the heating device is arranged to extend along the entire length of said closed circuit;
- the distribution bar comprises a base which forms a first part which extends the movable piston and a cover which covers the base so as to define the fluid distribution channel;

the base and the cover are assembled together by welding, by adhesive bonding, by clip-fastening or by any means that allows sealing of the circulation of fluid inside the channel in the volume of the distribution bar;

the fluid distribution channel extends mainly perpendicularly to the axis of elongation of the movable piston;

the heating device is pressed against an inside face of the base by means of said holding points;

the holding points of the heating device are arranged against the inside face of the base so as to cause the heating device to adopt a trajectory with a shape essentially similar to that of the fluid distribution channel.

According to a series of characteristics of the invention, unique to the telescopic assembly, and which can thus be combined with the characteristics relating to the distribution element and to the arrangement of the heating device in the bar which forms said distribution element, it can be provided that:

the movable piston is configured to slide in the interior of a hollow conveying body for the cleaning and/or drying liquid, the movable piston being configured to be traversed by the cleaning and/or drying liquid at least in the fully extended position of the distribution bar;

the hollow conveying body for cleaning fluid is a part which is rotationally symmetrical about an axis of elongation, closed at an upstream end by an inlet flange and accommodating the movable piston which is configured so as to slide in the hollow conveying body, parallel to the axis of elongation, the movable piston, hollowed out by an inner distribution conduit, being the carrier of the fluid distribution element at a downstream end;

the hollow conveying body accommodates a rod which extends jutting out from the inlet flange along the axis of elongation and around which the movable piston is capable of sliding, the movable piston and/or the rod being configured so as to allow the fluid to flow between them, depending on the position of the movable piston with respect to the rod, from the inlet flange to the distribution element, and a heating element is arranged on the rod;

the heating element, for example in the form of a heating wire, is arranged along the rod, so as to be arranged between the rod and the movable piston, in the cleaning fluid circulation channel, the cleaning fluid flowing between the rod and the movable piston being set to flow in contact with the heating element;

the heating element, for example in the form of a heating wire, extends in the interior of a heat conducting tube, along the axis of elongation, the beat conducting tube defining an outside casing of the rod, the cleaning fluid flowing between the rod and the movable piston being set to flow against the wall of the heat conducting tube;

the heating element extends in the interior of the rod from the inlet flange;

the heating element extends up to the free end of the rod opposite the inlet flange;

the heating element forms a loop in the vicinity of the free end of the rod opposite the inlet flange; the heating wire can notably be arranged so as to extend out and back in a U-shaped manner;

the rod comprises, at its free end opposite the inlet flange, means for holding the heating element.

According to a series of characteristics of the invention, it can be provided that:

through-channels are arranged in the inner wall of the distribution conduit of the movable piston so as to be able to control the flow rate of the cleaning fluid in the cleaning device, from its inlet into the intake chamber to its projection by the distribution element; said through-channels can be arranged parallel to one another and around the axis of elongation of the telescopic cleaning device;

each through-channel has an axial dimension (height of a channel in the direction of the longitudinal axis of elongation of the movable piston) and/or a radial dimension (depth of the channel within the thickness of the inner wall of the movable piston) which is identical and/or separate from that of neighbouring channels; it is understood that when the movable piston is in the fully retracted position, each through-channel is covered integrally and in a sealed manner by the rod so as to block the flow of cleaning fluid, whereas, when the movable piston adopts an intermediate position up to attaining its fully extended position, at least one end of a through-channel is unobstructed so as to allow the flow of cleaning fluid from the intake chamber to the distribution element;

a fluid intake nozzle, which is formed jutting out from the inlet flange and is offset with respect to the axis of elongation of the cleaning device on which is centred the hollow fluid conveying body into which it opens out;

elastic resetting means, preferably a compression spring, which are accommodated in the hollow conveying body in order to hear against the movable piston, opposite the intake chamber, and in order to aim to reset the movable piston into the fully retracted position.

A second object of the invention concerns an optical detection system which is intended to be fitted in a motor vehicle and comprises at least one optical sensor which is provided with an optical surface, the optical detection system being specific in that it comprises a telescopic cleaning device such as described previously, which is intended for projecting at least one cleaning and/or drying fluid onto the optical surface.

The cleaning device comprises at least one fluid distribution bar which is fitted with a heating device, and it can additionally comprise an additional heating element that is integrated in the telescopic assembly on which the distribution bar is mounted.

In an advantageous manner, the optical detection system can comprise, upstream of the heating cleaning device according to the invention, a heating conduit for conveying fluid inside which extends a resistive wire which is connected to a connector.

A third object of the invention concerns a motor vehicle which is fitted with at least one optical detection system which is fitted with a cleaning device such as described previously, intended for projecting at least one cleaning and/or drying fluid onto a glass surface to be cleaned of a motor vehicle, such as an optical surface of an optical sensor.

Other characteristics and advantages of the invention will appear more clearly on reading the detailed description of the embodiments of the invention, given below by way of illustrative and non-limiting examples and drawing on the accompanying figures, in which the telescopic cleaning device is shown according to one aspect of the invention, intended for projecting at least one cleaning and/or drying fluid onto a glass surface to be cleaned of a motor vehicle, and among which:

FIG. 5 is a perspective view of a distribution bar, in which is integrated, in particular, a heating device, according to a second embodiment.

It is first of all to be noted that if the Figures show the invention in a detailed manner for its implementation, they can of course serve to define the invention better should this be necessary. Likewise, it is noted that, for all the Figures, the same elements are designated by the same references. It will also be understood that the embodiments of the invention shown by the Figures are given by way of non-limiting examples. As a result, other configurations of the cleaning device according to the invention can be realized, notably by varying the arrangement and the dimensioning of the constituent elements of said cleaning device according to the invention, in particular, of the rod, the piston and/or of the fluid distribution element.

It is also noted that, in the description below, the designations "upstream" and "downstream" refer to the direction of flow of the fluid in the cleaning device according to the invention. Thus, the designation "upstream" refers to the side of the device according to the invention on which said fluid is taken in, and the designation "downstream" refers to the side of the device according to the invention on which the fluid is distributed outside the same, onto a surface of an optical sensor of an optical detection unit of a motor vehicle.

Figure 1:
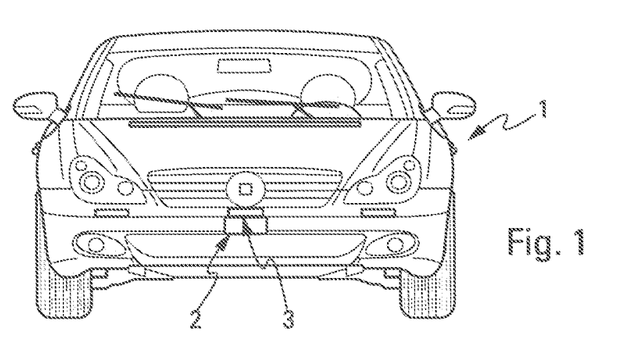
FIG. 1 is a front view of a vehicle where a detection system is installed comprising at least one cleaning device according to the invention.

FIG. 1 illustrates a vehicle r which comprises according to the invention a detection unit which is part of a driving assistance system, said detection unit comprising here an optical sensor 2 and a cleaning device 3 according to the invention on the front end of the vehicle 1. The detection unit is arranged here on the front end of the vehicle, notably on the radiator grille.

Figure 2:
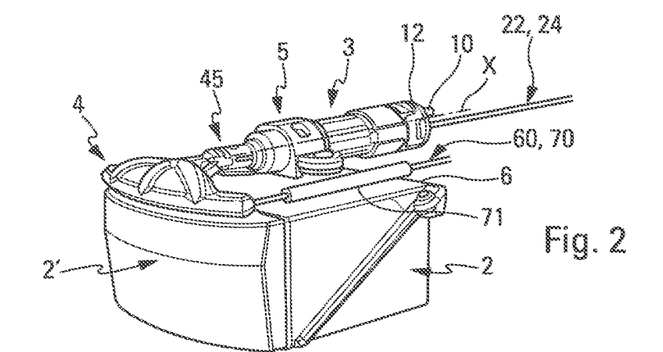
FIG. 2 is a schematic view in perspective of an embodiment of the cleaning device and of the associated optical sensor in an arrangement of a detection system according to the invention, the cleaning device comprising a distribution bar at the end of a hollow conveying body.

FIG. 2 shows the cleaning device 3, which is arranged in the vicinity of the optical sensor 2 and of its optical surface 2' and which comprises notably a fluid distribution element 4, here constituted by a distribution bar, which is fixed, by an end portion 45, to a downstream end of a hollow fluid conveying body 5 which has an elongated form along an axis of elongation X, the hollow fluid conveying body 5 being fixed on a housing 6 of the optical sensor 2.

According to the invention, the distribution element 4 comprises a distribution bar equipped with a heating device 60 integrated at least in part into the hollow body formed by the distribution bar. Notably, the heating device comprises a heating resistive wire 70 accommodated at least in part in a fluid distribution channel 56 arranged in the volume of the bar. The heating element has, in the example illustrated, the form of a heating resistive wire, without this limiting the invention when the heating element is accommodated, at least partially, in the interior of the distribution channel arranged in the volume of the bar.

Figure 3:
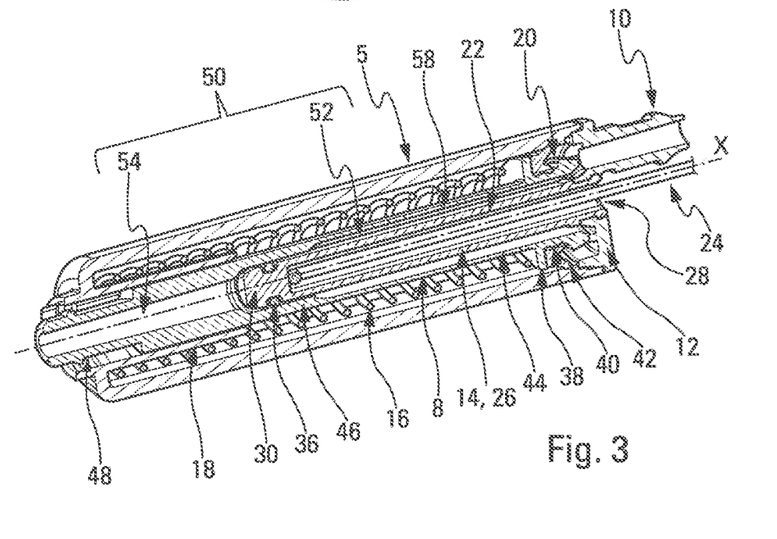
FIG. 3 is a sectional view of part of the cleaning device according to the invention showing the cooperation between constituent elements of said device, more particularly the cooperation between a rod, comprising a heating device, and a movable piston, shown here in the fully retracted position or in the rest position, inside the hollow conveying body shown in FIG. 2, FIGS. 4a, 4b and 4c are exploded views, respectively the front (4a, 4b) and the rear (4c), of the distribution element of the cleaning device according to the invention in the form of a distribution bar, in which is integrated, in particular, a heating device, according to a first embodiment.

Before the distribution element 4 is described in more detail according to different embodiments, reference is made to FIG. 3 which shows the interior of the hollow fluid conveying body 5 in order to show the cooperation between the constituent elements of said telescopic cleaning device 3, telescopic as a result of the movement of the movable piston 8. It should be noted that the distribution bar forming the distribution element 4 could be mounted on a telescopic assembly separate from the one which will be described and illustrated, and that the cleaning fluid could be fed into the distribution bar by other means than those which will be described below by way of example, when the bar comprises an installed heating device.

In the example shown, the telescopic cleaning device 3 is essentially made up, from upstream to downstream following a longitudinal axis X of elongation of the cleaning device 3, by a fluid intake nozzle 10, an inlet flange 12, a rod 14 which is joined to the inlet flange 12, the movable piston 8, an elastic resetting means 16 and the distribution element 4 which can be seen in FIG. 2. Each of said components is placed in a position of revolution around the axis of elongation X with respect to the hollow fluid conveying body 5.

The hollow fluid conveying body 5 is closed at an upstream end by the inlet flange 12 and it is configured to accommodate the movable piston 8 which is guided in translation along the axis of elongation notably by a guide sleeve 18 arranged in the hollow fluid conveying body 5 at the downstream end.

The fluid intake nozzle 10 is formed projecting from the inlet flange 12, and it extends opposite the hollow fluid conveying body 5, being offset here with respect to the longitudinal axis X of the hollow fluid conveying body 5. The intake nozzle 10 has a longitudinal through bore which opens out in the interior of the hollow fluid conveying body 5 into an intake chamber 20 which is delimited at least in part by the inlet flange 12, a peripheral wall of the hollow fluid conveying body and by the movable piston 8.

The inlet flange 12 is configured to close the upstream end of the hollow fluid conveying body 5. A sealing member can be provided for said closure. The inlet flange is configured to support the rod 14 on its inside face, facing the interior of the hollow fluid conveying body 5.

The rod 14 extends jutting out from the inlet flange 12, in the interior of the hollow fluid conveying body 5, so as, on the one hand, to form a translatory guide member for the movable piston 8, which is configured to slide around said rod 14, and, on the other hand, to form part of the translatory driving device of the movable piston under the effect of cleaning fluid pressure injected into the hollow fluid conveying body via the fluid intake nozzle 10. The operation of the telescopic cleaning device according to the invention will be described below.

The rod 14 extends, along the axis of elongation X, jutting out from the inlet flange 12 and it comprises here a heating element 22, having the function of heating up the cleaning fluid before it arrives in the distribution bar, complementing the fluid heating action carried out by the heating device installed in said bar.

The heating element 22 comprises, in the example illustrated in FIG. 3, a heating member, here a heating wire 24, and a heat conducting hollow cylindrical tube 26 extending along the axis of elongation X, the heating wire 24 being accommodated in the interior of the heat conducting hollow cylindrical tube 26. As a variant that is not illustrated here, the heating element may consist of a heating wire wound around the rod so as to be located directly in contact with the flow of cleaning liquid. Here too, the heating member 22 in the example shown is in the form of a heating wire, without this limiting the invention when the heating member is accommodated, at least partially, in the interior of the heat conducting tube.

In the example illustrated, the heat conducting tube 26 defines the outside casing of the rod 14, and, the fluid, which is to flow between the rod and the movable piston when the cleaning fluid pressure present in the hollow conveying body is sufficient to move the movable piston in opposition to the resetting force of the elastic means 16, flows directly against the wall of the heat conducting tube in such a way that the heat released at the wall of the tube by starting up the heating wire 24 is transmitted directly to the cleaning fluid traversing the movable piston in the direction of the distribution element 4.

In this way, the rod 14 has a form defined by the profile of the heat conducting tube, namely in this case a cylindrical hollow tube form, with an annular section, the outside peripheral face of which is smooth. The rod is thus hollow over its entire dimension along the axis of elongation, such that a passage opening 28 is arranged at the junction of the heat conducting tube 26 and the inlet flange 12 in order to allow access to the interior of the rod 14.

At the free end of the rod, that is to say the end opposite the inlet flange, the rod is closed by a nozzle 30, fitted on the downstream end of the heat conducting tube 26. The nozzle 30 comprises means for holding the heating wire 24 so as to ensure, notably, the tension of the wire and its position over the entire dimension of elongation of the rod 14. Other characteristics unique to the arrangement of the heating wire in the interior of the rod 14 will be described below when the assembly of the unit is described in more detail.

The nozzle 30 comprises a peripheral recess capable of accommodating an O-ring seal 36 so as to allow the piston 8 to slide in a sealed manner along said rod 14 which it surrounds. The O-ring seal 36 is configured to be supported against an inside face of the movable piston 8.

The nozzle is made here of plastic material, given that, according to one aspect of the invention, the heat conducting tube 26 is composed of a heat conducting metallic material, preferably brass or aluminium, in order to transmit the heat released by the heating wire 24 to the cleaning fluid made to pass along the outside peripheral face of the rod.

The movable piston 8, in the vicinity of its upstream end facing the inlet flange 12, comprises a crown 38 on the outside wall of which is arranged a peripheral recess 40, capable of accommodating a sealing element 42 so as to allow the mobile piston 8 to slide in a sealed manner in the hollow fluid conveying body 5, and thus to ensure the circulation of the fluid into the interior of the movable piston 8, between said piston and the rod 14. The sealing element 42 is preferably a lip seal, capable of limiting the friction of the movable piston 8 in the hollow body 5.

The movable piston 8 comprises substantially cylindrical portions which can be defined, upstream to downstream, as being an intake part 44 bearing the crown 38, a central part 46 capable of sliding inside the hollow guide sleeve 18 arranged at the downstream end of the hollow fluid conveying body corps 5 and an end distribution part 48, with a smaller diameter.

The movable piston 8 is hollowed out by an interior distribution conduit 50 for the cleaning fluid so which comprises, at its upstream end, an upper extended portion 52 which allows the movable piston 8 to slide around the rod 14 and, at its downstream end, a lower portion 54 with a smaller diameter, which allows the cleaning fluid, which is arranged to circulate in the interior of the movable piston 8, to be pressurized for the purpose of its projection from the distribution element 4 onto the optical sensor 2.

Figure 4A:
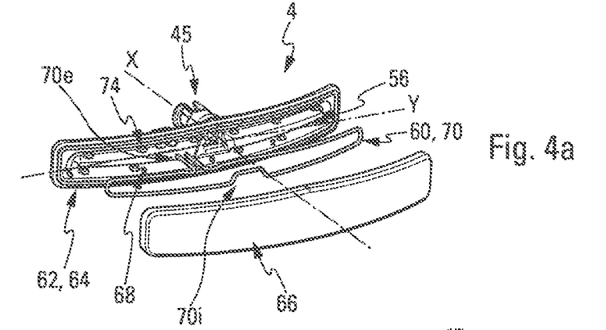
Figure 4B:
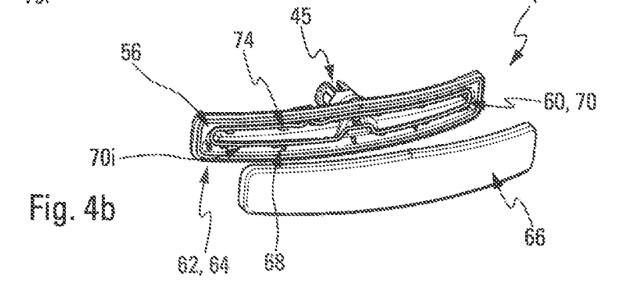
Figures 4C, 5:
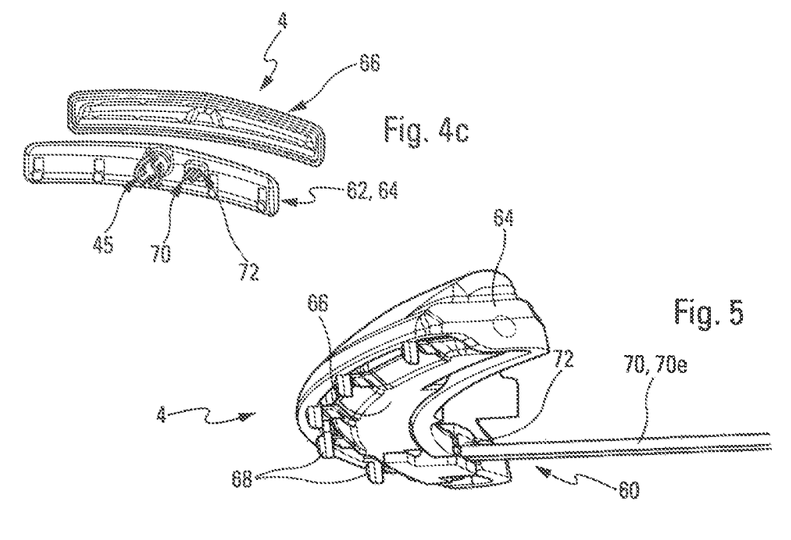

The mobile piston 8 is connected, by the fluid distribution end part 48, to the cleaning fluid distribution element 4 which, according to a preferred embodiment of the invention shown in FIG. 2, is constituted by a distribution bar 4 which is fixed to a downstream end of the hollow fluid conveying body 5, that is to say to the fluid distribution end part 48 of the movable piston 8, by an end portion 45 (shown in FIG. 2 for example). More specifically, the fluid distribution end part 48 of the movable piston 8 is arranged so that the lower portion 54 of the distribution conduit 50 which is arranged in the piston 8 is able to communicate with the fluid distribution channel 56 arranged in the distribution element 4, in particular of the distribution bar, as can be seen in FIGS. 4a to 4c.

The movable piston 8 is mounted in the hollow fluid conveying body 5 around the rod 14 which extends substantially coaxially to the movable piston 8, such that at least the nozzle 30 forming the free end of the rod 14 extends into the interior of the inside distribution conduit 50 of the movable piston 8. The movable piston 8 slides in the hollow conveying body 5 between a fully retracted position, or rest position, and a fully extended position, or cleaning position, under the effect of the pressure of the cleaning fluid arriving in the intake chamber 20 via the intake nozzle 10. The elastic resetting means 16, preferably a helical compression spring, is arranged in the hollow fluid conveying body 5 between the peripheral wall of the hollow body and the movable piston 8, so as to be supported at one end on the bottom of the hollow body 5, around the guide sleeve 18 and at the opposite end on a face of the crown 38. The elastic resetting means 16 is capable of deforming under the effect of the fluid pressure so as to allow the longitudinal movement of the movable piston 8. It is thus understood that in the phase for loading the fluid into the cleaning device 3, the movable piston 8 moves opposite the intake chamber 20 then carries out a reverse restoring movement at the end of the cleaning phase by ejecting the fluid.

The movable piston 8 and/or the rod 14, here the movable piston 8, are configured to comprise through-channels 58 which allow the cleaning fluid to flow in the interior of the movable piston from the intake chamber 20, the variable volume of which is defined depending on the position of the movable piston 8 relative to the inlet flange 12. The though-channels 58 are each formed by a groove, arranged here in the inside wall of the movable piston 8 delimiting the inside distribution conduit 50. It is understood that during the sliding of the movable piston 8 relative to the rod 14, the fluid is blocked in the through-channels as long as the O-ring seal 36, arranged in the nozzle 30 of the rod 14, is situated downstream of the end of said through-channels (as can be seen in FIG. 3), and the fluid is able to escape from the through-channels onto the distribution element 4 when at least one end of the through-channels is situated beyond the O-ring seal 36.

The through-channels 58 can have different axial and/or radial dimensions so as to be able to control the progressive arrival of the fluid in the distribution element 4. The expression "axial dimension" is to be understood as the height of a through-channel 58 in the direction of the longitudinal axis X of elongation of the movable piston 8, whilst "radial dimension" is to be understood as the depth of said through-channel 58 within the thickness of the inside wall of the movable piston 8 in which the through-channels 58 can be arranged.

The heat conducting tube 26 surrounds the heating wire 24 and they extend along the axis of elongation X in a centred position with respect to the inlet flange 12.

The heating wire 24 extends in the interior of the heat conducting tube 26 from the inlet flange 12 to the nozzle 30 arranged at the end of the heat conducting tube 26.

In the example shown, the heating wire 24 has at the nozzle 30, and thus in the vicinity of the downstream end of the rod, a loop shape so as to have two strands extending side by side, respectively traversing the inlet flange at the passage opening 28 (as can be seen in FIG. 3, in which only one of the strands of the heating wire can be seen on account of the section). The size of the passage opening 28 is greater than the size of the strands of the heating wire 24 pressed against one another.

In this way, the heating wire has a U shape with the base arranged at the nozzle 30. The nozzle 30 can be provided with a base intended to be inserted, for example by force, into the heat conducting tube 26, at the downstream end of same, and this base can comprise an eyelet configured to be traversed by the heating wire at its loop. It is understood that during assembly, the end of the heating wire is passed into the eyelet forming the holding opening, and the heating wire is folded around said eyelet in order to form the loop.

A filling material, notably of resin or gel type, is injected into the interior of the heat conducting tube, via the passage opening 28, once the heating wire 24 has been placed inside the tube 26. Said filling material extends in the tube from the base of the nozzle 30 to the inlet flange, if appropriate overlapping the passage opening 28 in order to spread over the outside face of the inlet flange. In this way, on the one hand, the seal between the inlet flange 12, the passage opening 28 through which the heating wire 24 enters and exits, and the interior of the heat conducting tube 26 is ensured, and on the other hand, the position of the heating wires inside the heat conducting tube is fixed in order to prevent them from moving during operation.

It is understood that the heating wire 24, connected electrically to an electric power source by means of a connector (not shown), is capable of heating the heat conducting tube 26 composed of a heat conducting material, preferably brass or aluminium.

When an optical surface requires cleaning, and cleaning liquid traverses the hollow conveying body 5 between the rod 14 and the movable piston 8, as has been stated previously, it can be activated automatically, on demand from the user, or even following the detection of specific meteorological conditions, the cleaning liquid being heated by means of the heating device that is integrated in the rod 14.

Thus, the function of the rod 14, fitted with the heating device 22, apart from its function of guiding the movable piston and its function of controlling the quantity of cleaning liquid moving onto the distribution element, is to heat, by conduction, fluid which penetrates into the cleaning device 3 through an intake nozzle 10 of the inlet flange 12 and which flows along the outer wall of the rod 14.

In the embodiment shown, the heat conducting tube 26 has the function of homogeneously distributing the heat to be transmitted to the fluid flow, and it makes it possible to hold the heating member in position, if appropriate with the aid of the nozzle 30 and the filling material.

The distribution element will now be described in more detail, which comprises a specific distribution bar 4 in that it comprises a heating device 60 integrated at least in part in the bar and independent of heating element(s) that may be present in the rod 14, as was described above.

FIGS. 4a, 4b and 4c show the distribution bar 4 of the cleaning device 3 according to a first embodiment of the invention.

The distribution bar 4 extends transversely on both sides of the axis of elongation X of the movable piston and of the hollow conveying body 5 in the example shown. More precisely, the distribution bar 4 comprises, opposite its end portion 45 by means of which it is attached to the hollow conveying body 5, a distribution portion 62 which extends, in a transverse direction Y which is substantially perpendicular to the axis of elongation X, on both sides of the downstream end of the conveying body 5 and of said axis of elongation X. In the example illustrated, the distribution portion 62 extends transversely essentially symmetrically on both sides of the downstream end of the conveying body such that the bar can be considered to have transverse symmetry with respect to the axis of elongation X. The distribution portion 62 is formed by a base 64 which forms a first part which extends the distribution bar 4 and is capable of being assembled, preferably by welding, to a second part which forms a cover 66 so as to define, between said two parts, the fluid distribution channel 56 which comprises in the bottom part a plurality of fluid distribution openings 68 for the ejection of the same onto the optical surface to be cleaned when the distribution element 4 is in the extended position.

It will be understood from the above that the fluid distribution channel 56 is configured to communicate with the cleaning/drying fluid supply means and to allow the ejection of said fluid via the distribution openings. The cleaning/drying fluid supply means can consist of the hollow conveying body as was described above, with the fluid fed in the interior of the movable piston, or consist of fluid feeding means separate from the movable piston, if appropriate off-centre with respect to the axis of the movable piston.

The heating device 60 here comprises a resistive wire 70, which is separate from the heating wire 24 of the heating element 22 associated with the rod 14 and connected electrically to an electric power source by means of a connector which is not shown here. The resistive wire is arranged so as to extend at least in part in the distribution channel 56 and to be in direct contact with the cleaning fluid arranged to circulate in said channel with ejection via the distribution openings. In the following text, the heating device in the form of a resistive wire will be described, without this limiting the invention when the heating device is accommodated, at least partially, in the interior of the distribution channel.

It is understood that the heating device comprises a part 70i that is inside the distribution bar 4, and a part 70e that is outside the bar which may be connected to the connector. In other words, the inside part 70i extends in the hollow body, and for example in the distribution channel, and the outside part 70e extends outside the bar. A passage opening 72, realized here in the base 64, allows said two parts of the heating device to be connected, whilst allowing the heating device to pass through the base. The diameter of the passage opening 72 is greater than the outer diameter of the heating device.

The heating device 70 may notably have, in its inside part 70i, the form of a loop arranged in the distribution channel, such that the outside part is formed by two joined ends. The loop formed by said inside part 70i may also be disposed in a punctiform manner at the outlet of the passage opening, such that the heating device generates a determined zone across the flow of fluid circulating in the distribution channel, or it can be widened in order to follow the distribution channel and generate a continuous heat exchange zone over the entire distribution channel.

In the first embodiment illustrated, and as can be seen notably in FIGS. 4a and 4b, the fluid distribution channel 56 forms a closed circuit between the cleaning/drying fluid supply and the distribution openings 68, and the part inside the heating device is arranged to extend along the entire length of said closed circuit. The closed circuit of said fluid distribution channel is such that it comprises two main parts which are connected together at their lateral ends, that is to say at a distance from the cleaning/drying fluid intake, and one of which communicates with the cleaning/drying fluid supply and the other of which comprises the distribution openings 68.

As shown in FIG. 4b, the part inside the bar of the heating device runs along the fluid distribution channel 56, being held on the inside face of the base 64 of the distribution portion 62, that is to say the face of the base facing the cover 66, by means of a plurality of holding points 74 which are arranged on said inside face of the base.

The length of the part 70i inside the heating device is defined depending on the length of the fluid distribution channel 56 and the length of the part outside the resistive wire is defined so as to allow the movable piston 8 of the telescopic cleaning device 3 to move in its fully extended position. In other words, the shape and size of the inside part 70i remain fixed during the movement of the distribution bar from its fully retracted position to its fully extended position, since they only depend on the length of the fluid distribution channel 56. And, at least one of the shape and the size of the outside part 70e is made to change during the movement of the distribution bar, the distance between the bar and the electrical connector to which the heating device is connected changing during this movement. Provision could made to arrange the part outside the heating device at a distance from the movable piston 8, in order that it does not impede the movement of the piston and thus the extension of the distribution bar, and/or in a sheath 71 so that it does not get snarled up when the distribution bar moves into its retracted position.

In accordance with what has been described previously for the heating wire 24 and the rod 14, a filling material, notably of the resin or gel type, can be added into the passage opening 72 in order to ensure the seal between the distribution portion 62, the passage opening 72 and the heating device.

A second embodiment of the distribution bar is illustrated in FIG. 5, which differs notably by the arrangement of the base and the cover, in this case attached to the base, in a plane essentially parallel to the direction of projection of the cleaning/drying fluid by the projection spouts.

In accordance with the above description for the first embodiment, a resistive wire 70, forming here a heating device 60, is associated with said distribution bar with an inside part (not shown here) arranged in the interior of said bar in continuation of an outside part 70e. Here too, a passage opening 72 is realized in the base to facilitate the passage of the heating device into the interior of the bar and filling material can be injected in order to block this passage opening once the heating device has been installed.

It is understood that the cleaning device according to one aspect of the invention comprises at least one heating device which is arranged in the distribution bar at the end of the hollow fluid conveying body. It is also possible in an additional manner to provide a first additional heating device such as has been described on the rod, around which the movable piston slides for the telescopic extension of the distribution element, and it is also possible, as an alternative to or in addition to said first additional heating device, to consider arranging a second additional heating device in a cleaning and/or drying fluid conveying conduit which is arranged upstream of the heating cleaning device according to the invention for its supply with fluid, the second additional heating device being in the form of a resistive wire which is connected to a connector and arranged in or on the perimeter of the conveying conduit. It is therefore possible to control the implementation of the one and/or the other of the heating devices in order to adapt to the meteorological conditions, without needing to oversize each of said heating devices. The necessary electric power supply is thus quantified in an accurate and efficient manner, by implementing each of the heating devices in very cold conditions and just the heating device arranged in the distribution bar when the temperatures are less extreme.

The above description clearly explains how the invention enables the objectives that it set to be achieved and notably proposes a compact telescopic cleaning device which is capable of improving the cleaning power of a cleaning and/or drying fluid which is projected onto an optical surface of an optical sensor thanks to the arrangement of at least one heating device, which is easy to implement and install, in said cleaning device.

The invention is not limited to the embodiments given specifically by way of non-limiting examples in this document and extends, in particular, to all equivalent means and to all combinations of said means that are technically effective.

The invention claimed is:

1. A telescopic cleaning device for projecting at least one cleaning and/or drying fluid onto a glass surface to be cleaned of a motor vehicle, comprising:
   at least one fluid distribution element, rendered movable, along an axis of elongation and at the end of a movable piston between a retracted first position and an extended second position for cleaning and/or drying, wherein the at least one fluid distribution element comprises a distribution bar inside which a fluid distribution channel extends,
   the distribution bar extends transversely on both sides of the axis of elongation along which the movable piston slides, and
   the distribution bar is equipped with a heating device integrated at least in part into the distribution bar to heat the fluid passing through said distribution channel.

2. The telescopic cleaning device according to claim 1, wherein the heating device comprises a resistive wire.

3. The telescopic cleaning device according to claim 1, wherein the heating device is arranged so as to extend at least in part in the distribution channel.

4. The telescopic cleaning device according to claim 1, wherein the heating device has an inside part accommodated in a hollow body defined by the distribution bar and an outside part which extends outside the distribution bar, the heating device being configured to traverse a passage opening arranged in a wall of the distribution bar.

5. The telescopic cleaning device according to claim 4, wherein the length of the part inside the heating device depends on the length of the fluid distribution channel and the length of the part outside the heating device depends on the path of movement of the distribution bar between the fully retracted position and the fully extended position.

6. The telescopic cleaning device according to claim 4, wherein the part outside the heating device extends at a distance from the movable piston.

7. The telescopic cleaning device according to claim 4, wherein the part outside the heating device is arranged in a sheath.

8. The telescopic cleaning device according to claim 3, wherein the heating device extends along the fluid distribution channel, being held by means of a plurality of holding points.

9. The telescopic cleaning device according to claim 1, wherein the distribution bar extends essentially symmetrically on both sides of the axis of elongation along which the movable piston slides.

10. The telescopic cleaning device according to claim 1, wherein the fluid distribution channel communicates with a cleaning/drying supply means and comprises a plurality of distribution openings for this fluid for the ejection of same onto the glass surface to be cleaned.

11. The telescopic cleaning device according to claim 8, wherein the distribution bar comprises a base which forms a first part which extends the movable piston and a cover which covers the base so as to define the fluid distribution channel.

12. The telescopic cleaning device according to claim 11, wherein the heating device is pressed against an inside face of the base by said holding points.

13. The telescopic cleaning device according to claim 1, wherein the movable piston is configured to slide in the interior of a hollow conveying body for cleaning and/or drying fluid, the movable piston being configured to be traversed by the cleaning and/or drying fluid at least in the fully extended position of the distribution bar.

14. The telescopic cleaning device according to claim 13, wherein the hollow conveying body comprises a heating element separate from the heating device integrated at least in part into the distribution bar.

15. An optical detection system to be fitted in a motor vehicle, said system comprising:
- at least one optical sensor comprising an optical surface;
- and a telescopic cleaning device for the optical surface according to claim 1.

* * * * *